May 10, 1927. 1,627,770
C. H. DURKEE
APPARATUS FOR PROCESSING FOODSTUFFS AND THE LIKE
Filed Aug. 30, 1924   2 Sheets-Sheet 1

Chauncey H. Durkee
INVENTOR
BY George Ramsey
ATTORNEY

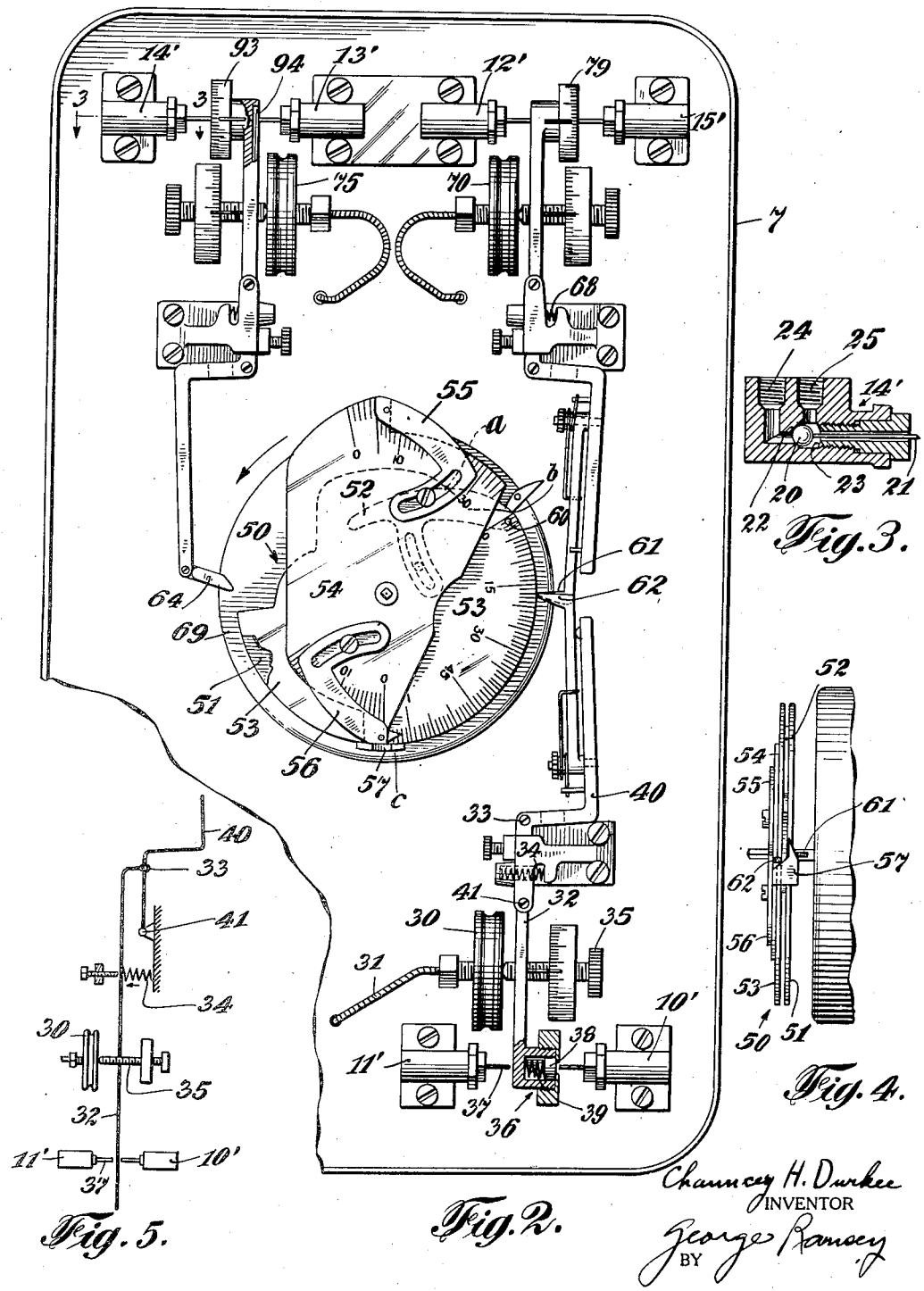

Patented May 10, 1927.

1,627,770

UNITED STATES PATENT OFFICE.

CHAUNCEY H. DURKEE, OF BRONX, NEW YORK, ASSIGNOR TO ANCHOR CAP AND CLOSURE CORPORATION, OF LONG ISLAND CITY, NEW YORK, A CORPORATION OF NEW YORK.

APPARATUS FOR PROCESSING FOODSTUFFS AND THE LIKE.

Application filed August 30, 1924. Serial No. 735,066.

This invention relates to apparatus for processing food stuffs and the like and particularly to apparatus for cooking food stuffs after they have been packed in containers.

An object of the present invention is to provide an apparatus which will reduce the amount of labor required in processing food stuffs and the like.

Another object of the invention is to provide an apparatus which will eliminate the human element from certain steps involved in processing food stuffs and the like.

A more specific object of the invention is to provide a system for processing food stuffs and the like in which conditions within a cooking retort are automatically controlled and clock actuated means is provided to produce a desired cycle of conditions within the retort.

Other objects will be apparent from the following description of a system embodying the present invention.

Many food stuffs when packed in a sealed container and heated to a definite temperature generate a pressure within the container which is greater than the pressure of steam at the same temperature. This has frequently resulted in the rupture of sealed containers during processing to preserve the food stuffs previously packed. This difficulty, however has previously been overcome in the prior art by carrying on the cook in a closed vessel, usually termed a retort, in which the external steam pressure upon the packages being cooked is supplemented by auxiliary pressure obtained by forcing compressed air into the retort. In the use of such systems in the prior art, it has been customary to load the retort at room temperature with a batch of sealed containers to be processed and then gradually bring the retort up to cooking temperature by the admission of steam through a manually controlled valve. The required auxiliary pressure has been similarly applied by the admission of compressed air through a manually controlled valve. After cooking conditions have been obtained automatic means have been used to maintain the temperature and pressure. At the end of the cooking period the steam has been cut off by an operator and the temperature of the retort gradually reduced by the admission of cooling water the temperature of which is initially only slightly lower than the cooking temperature, but which is gradually reduced by manually controlled steam and water valves manipulated by the operator.

In the processing of foodstuffs packed in glass jars the changes in temperature of the cooking retort must be very gradually effected to prevent fracture of the jars, and in many cases the heating and cooling periods each extend over a period of a half hour. This required the constant attention of an operator for a considerable portion of the total processing time; and in order to obtain the shortest heating and cooling periods consistent with safety to the glass containers, the apparatus had to be controlled by a skilled operator.

The present invention is an improvement upon the processing apparatus of the prior art, and contemplates an apparatus which carries out the entire process automatically from the beginning of the heating period to the end of the cooling period. This dispenses with the attention of an operator during the heating and cooling periods and completely eliminates the human element involved in the rate of heating and cooling.

In the form of the invention illustrated, the desired conditions within a retort are adapted to be obtained by the admission and discharge of compressed air or fluid under pressure, steam, and cooling water at appropriate times; and the flow of these fluids is preferably controlled by compressed air operated motor valves. Connected to each of these motor valves is a pilot valve which is operatively associated with automatic control mechanism to produce appropriate admission and discharge of operating air to the motor valves thereby suitably manipulating the motor valves to obtain the desired conditions within the retort. The automatic control mechanism which operates the pilot valves consists of three expansible spring capsules, each of which functions during at least a portion of the processing period. One of these capsules is connected to be responsive to the temperature within the retort, another to be responsive to the pressure within the retort, and the third to be responsive to the temperature of cooling medium; and associated with the capsules is clock actuated mechanism which establishes the cycle of conditions desired during the processing period.

Fig. 1 of the drawings is a diagrammatic perspective view showing a system embodying the invention.

Fig. 2 is an elevation showing the pilot valves and the automatic control mechanism.

Fig. 3 is a sectional view showing the construction of one of the pilot valves.

Fig. 4 is a fragmentary sectional view showing clock driven cams and certain cam fingers cooperating therewith.

Fig. 5 is a schematic diagram illustrating the mechanical movement of a portion of the apparatus for actuating the pilot valves.

Fig. 6 is a time diagram illustrating a cycle of retort conditions.

Figure 1:
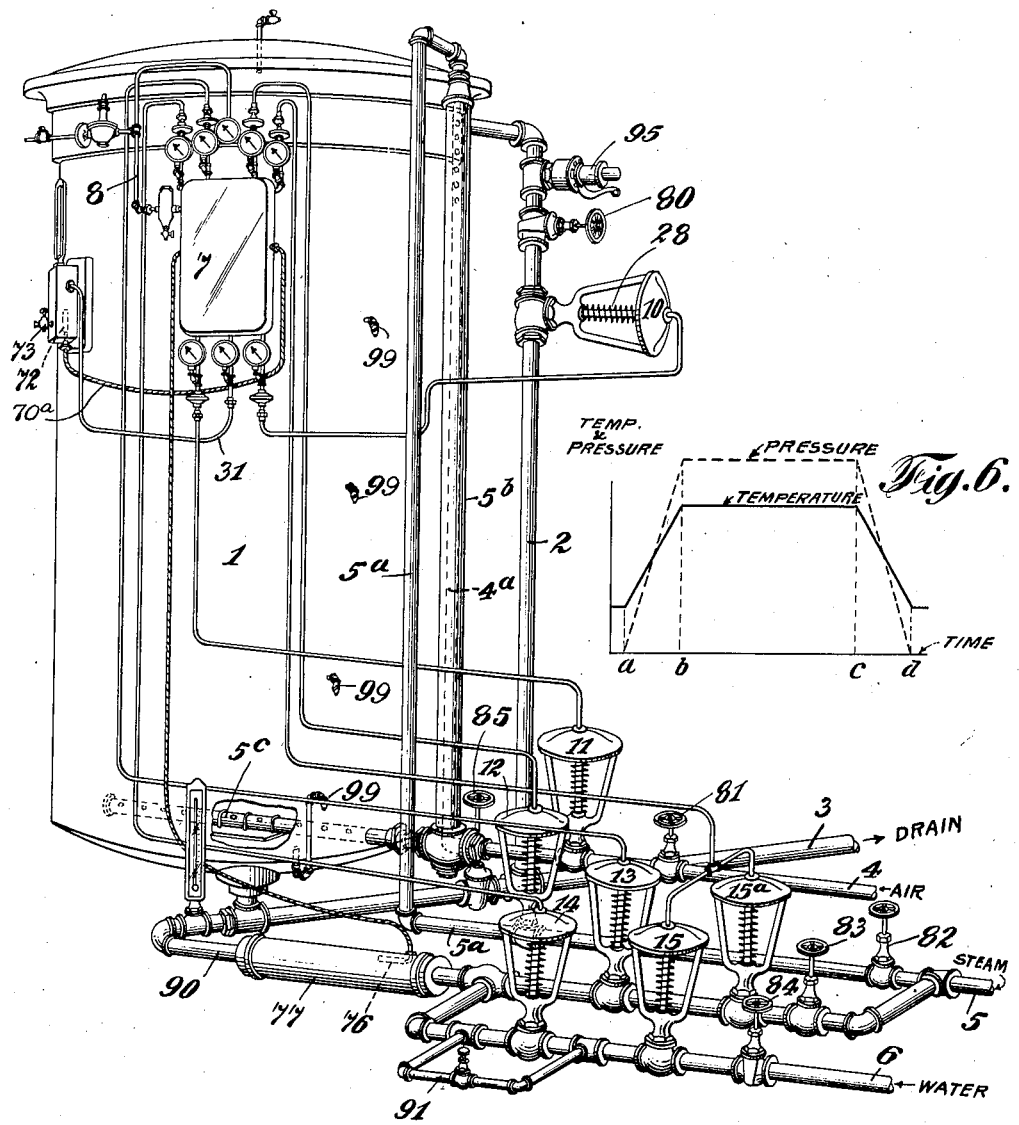

Referring to Figure 1, a retort 1 in which the cook is carried out has associated therewith a vent pipe 2 drain pipe 3, compressed air pipe 4, steam pipe 5, and cold water pipe 6. Steam which is utilized for heating of the retort passes thru pipe 5$^a$ to the top of vertical pipe 5$^b$ where it mixes with compressed air which passes from pipe 4 to vertical pipe 4$^a$ within pipe 5$^b$ and is discharged into pipe 5$^b$ through holes near the top of pipe 4$^a$. The mixture of steam and air passes down through pipe 5$^b$ and enters the retort through perforations in pipe 5$^c$.

The flow of fluids through the various pipes associated with the retort is controlled by motor valves 10, 11, 12, 13, 14, 15, and 15$^a$. These valves are all identical, each being of a well known type in which the valve is biased in its open position by a spring and is adapted to be closed by air pressure acting against a diaphragm. Motor valves 15 and 15$^a$ are jointly connected to pilot valve 15′ (Fig. 2), and each of the other motor valves 10 to 14 inclusive, is connected to a respective pilot valve designated by a corresponding primed numeral (Fig. 2). These pilot valves and automatic control mechanism, which will be described later, are located in a casing 7 shown in Fig. 1. The pilot valves are all identical and each consists essentially of a ball 20. Fig. 3, having a loosely fitting stem 21 and adapted to cooperate selectively with either seat 22 or seat 23. Passageway 24 is connected by means of pipe 8 (Fig. 1) to an air supply at suitable pressure, e. g. a gauge pressure of 15 pounds, and passageway 25 is connected with the diaphragm chamber of the motor valve to be controlled. When stem 21 is not influenced, pressure entering through passage 24 maintains ball 20 against seat 23 and the compressed air passes through passageway 25 to the diaphragm chamber of the corresponding motor valve, thus maintaining the valve closed. When stem 21 is pushed against seat 22, the air supply is cut off, and air leaks from the diaphragm chamber of the motor valve back through passage 25 and out around the stem of the pilot valve, thus allowing the motor valve to be opened by the action of a spring such as 28 (Fig. 1).

Reference will now be had to Fig. 2 which shows the casing 7 of Fig. 1 with the cover removed to disclose the mechanism therein. A spring capsule 30 is in communication with the interior of the retort thru conduit 31 and is so arranged that its right hand end assumes a position which is dependent upon the pressure within the retort. A lever 32 is pivoted at 33 (Figs. 2 and 5) and biased by a spring 34 which urges adjustable screw 35 against the right hand end of the capsule 30. By this arrangement the capsule operates to position adjustable head 36 in accordance with the retort pressure. If the retort pressure is too low head 36 pushes in the stem 37 of pilot valve 11′ thus relieving the air pressure against the diaphragm of motor valve 11 (Fig. 1) which opens under the action of its spring and admits compressed air or other fluid under pressure to the retort to increase the pressure therein. When the pressure has been raised to the required value, head 36 ceases to influence valve stem 37 thus permitting the restoration of pressure in the diaphragm chamber of motor valve 11 thereby closing the valve and terminating the admission of fluid pressure to the retort. If the pressure in the retort rises too high head 36 pushes in the stem of pilot valve 10′ thereby causing motor valve 10 to open and reduce the retort pressure through vent pipe 2.

The cooperation of head 36 which the stem of pilot valve 10′ is through plunger 38 pressed by spring 39 which is strong enough to actuate valve 10′, but permits lever 32 to be moved a considerable distance to the right after the stem of valve 10′ has been pushed in. This prevents undue strain of capsule 30 in case the retort pressure should reach a value so high that the right hand end of the capsule would tend to move beyond the point at which head 37 operates pilot valve 10′ to open the motor valve 10 in the vent pipe.

The pivot 33 of lever 32 is mounted on a lever 40 which is adapted to swing on a fixed pivot 41 (Figs. 2 and 5). It is therefore apparent that movement of lever 40 will shift lever 32 more or less bodily producing a result similar to an adjustment of screw 35 the setting of which determines the value of retort pressure which the apparatus will maintain. The position of lever 40 is governed by a composite cam, denoted in general by 50, which gives the lever a cycle of movement, thus producing a corresponding cycle of pressure conditions within the retort.

The capsule 70 is connected by a conduit 70ᵃ with an ether bulb 72 (Fig. 1) which is in a compartment communicating with the retort and provided with a bleeder cock 73. Sufficient heating fluid escapes from the retort through bleeder cock 73 to prevent stagnation in the compartment containing ether bulb 72, thus insuring that the ether bulb will be kept at the retort temperature. The ether within bulb 72 is confined at constant volume and being quite volatile a pressure builds up within the bulb to a value which is dependent upon the retort temperature. This pressure is communicated by conduit 70ᵃ to capsule 70 thus positioning the right hand end (Fig. 2) i. e. the operative surface of the capsule, in a position which is dependent upon the retort temperature. As shown in Fig. 2, there is associated with capsule 70 mechanism which actuates pilot valves 12' and 15' in response to the temperature within the retort. A third capsule 75 is connected to an ether bulb 76 (Fig. 1) to render it responsive to the temperature of water within a mixing chamber 77 which will be mentioned later. This capsule has associated therewith mechanism which actuates pilot valves 13' and 14'. The mechanisms which are associated with capsules 70 and 75 are, each similar to that associated with capsule 30 and hence a detailed description of these mechanisms is believed to be unnecessary.

The composite cam which is denoted in general by 50 is adapted to be rotated by suitable clock mechanism 69, and is made in five layers as shown by the edge view of Fig. 4. Layers 51 and 53 are identical and are superimposed, being separated by a cam member 52 which forms the intermediate layer and is adjustably pivoted to layers 51 and 53 at 60. Cam finger 61 which is part of the mechanism associated with capsule 70 cooperates primarily with cam layer 51; and cam finger 62 which is part of the mechanism associated with capsule 30 cooperates primarily with cam layer 52. At certain positions of the composite cam, however, both of these cam fingers cooperate with the intermediate cam element 52. A fourth cam layer 54 is angularly adjustable with respect to cam layers 51 and 53 and carries a fifth cam layer consisting of cam elements 55 and 56 which are adjustable as shown. An adjustable cam finger 64 which is part of the mechanism associated with capsule 75 cooperates with cam layer 54 and with cam element 55. Cam layer 54 also carries a wedge-like cam 57 which is positioned adjacent the periphery of cam layers 51 and 53 as shown in Fig. 4. The composite cam rotates counter-clockwise (Fig. 2); and the cam fingers 61 and 62 are spring pressed and pivoted as shown to render them movable in a plane parallel to the composite cam. As cam 57 approaches fingers 61 and 62 due to the rotation of the composite cam, the wedge end of element 57 enters between fingers 61 and 62 thereby throwing finger 61 out of cooperation with the cam and allowing it to be pushed inward between the cam and clock 69 by spring 68. Similarly cam 57 swings finger 62 in the opposite direction, removing it from cam layer 53 and placing it upon cam element 56.

The operation of the apparatus is as follows:—The retort having been loaded with a batch of packages to be processed and having been hermetically sealed, the composite cam is turned so that fingers 61 and 62 engage cam element 52 at a point a and the clock mechanism is started. Hand valves 80 to 84 inclusive are opened and hand valve 85 is closed. In response to the movement of capsule 30 pilot valves 10' and 11' are actuated, thereby manipulating motor valves 10 and 11 in the vent pipe and pressure fluid pipe respectively, to regulate the pressure within the retort. As the cam is rotated by the clock, finger 62 is gradually moved outward by cam element 52 thereby moving screw 35 to the right and gradually increasing the value of retort pressure for which the mechanism regulates. In response to the movement of capsule 70, pilot valve 12' is actuated, thereby manipulating motor valve 12 in the steam line to regulate the temperature of the retort. Head 79 is so adjusted that it does not influence the stem of pilot valve 15' at this time. Cam finger 61 is gradually moved outward by cam element 52 in synchronism with the movement of cam finger 62, thus gradually increasing the value of retort temperature for which the mechanism regulates.

When the composite cam reaches the position where the point marked b is in registration with fingers 61 and 62 the cooking temperature and pressure have been reached and the cooking period proper begins as indicated by the zero mark of the scale on cam layer 53. During the cooking period finger 61 rides on cam layer 51 and finger 62 rides on cam layer 53, and no movement of the fingers takes place for the reason that the sections of the cam layers are circular. The temperature and pressure of the retort are, therefore, held constant during the cooking period proper.

At the end of the cooking period which occurs when point c of the composite cam registers with fingers 61 and 62, finger 61 is thrown off of cam 51 by the action of element 57 and forced inwardly between the cam and the clock mechanism by spring 68.

At this time capsule 70 is considerably expanded and therefore this action suddenly moves head 79 a considerable distance to the right thereby pushing in the stem of pilot valve 15′ and causing motor valves 15 and 15ª to be opened. This permits steam and a cooling medium such as cold water to be admitted to mixing chamber 77 under the control of motor valves 13 and 14 governed by pilot valves 13′ and 14′ respectively. Pilot valves 13′ and 14′ are controlled by spring capsule 75 which is responsive to the temperature of the fluid in the mixing chamber, and at this time or shortly thereafter depending upon the adjustment of cam finger 64, cam finger 64 starts to move inward gradually under the control of cam element 55 thereby gradually reducing the value of the cooling medium temperature for which the apparatus regulates. The cooling medium such as cold water passes from the mixing chamber through pipe 90 to the retort and is discharged through vent pipe 2 to the drain pipe 3. To forestall the possibility of live steam being shot into the retort through the cooling medium line, a small amount of water for example, may be passed around motor valve 14 through by-pass 91, thus maintaining water or cooling medium in the mixing chamber throughout the cooling period regardless of the position of motor valve 14.

In attempering the cooling medium it is desirable at certain times that the cooling control valve 14 be manipulated while the steam control valve 13 is held open, or vice versa. For this reason the head 93 which is associated with the pilot valves 13′ and 14′, in addition to being constructed with a spring pressed plunger (not shown) similar to the plunger 38 of head 36, is provided with a flat spring or spring pressed member 94 which is strong enough to push in the stem of pilot valve 13′. This permits the head to move and actuate pilot valve 14′ while maintaining the stem of pilot valve 13′ pushed in.

The apparatus may be used for either a "steam cook" or a "water cook", which terms refer to the medium to which the containers being processed are subjected. If a steam cook is to be used, all water is drained from the retort before the run is started, and the containers being processed are subjected only to steam and air or other fluid pressure until the cooling period is reached. If a water cook is to be used the batch of containers is submerged in water before the run is started; pet cocks 99 being provided to indicate the level of water in the retort. In this case the pressure is maintained by the admission and discharge of air as with a steam cook, and the water bath surrounding the containers is heated by steam admitted under the control of valve 12. If at any time the pressure within the retort should rise to a dangerous value it will be relieved by safety valve 95.

A complete cycle carried out by the apparatus with either a steam or water cook is illustrated by the time diagram of Fig. 6. At time $a$ the composite cam is in the position where point $a$ registers with cam fingers 61 and 62 and the temperature and pressure begin to rise. At time $b$ the cooking period proper begins, the temperature and pressure remaining constant until the end of the cooking period at time $c$. At this time cooling begins and is carried out until time $d$ when the retort has been restored to the initial temperature and pressure.

From the foregoing description of a suitable form of the present invention it is seen that an apparatus has been provided which operates entirely automatically from the beginning of the heating period to the end of the cooling period. It is also apparent that the apparatus greatly reduces the amount of labor involved in the processing of foodstuffs and the like, and that it eliminates the human element from the rate of heating and cooling of the retort used.

It is, of course, obvious that the present invention may be embodied in forms other than that herein particularly disclosed, and hence it is desired that the present disclosure be considered as illustrative and not in the limiting sense.

Having thus described my invention, what I claim is:

1. An apparatus for processing food stuffs and the like comprising a retort, a steam supply, a compressed air supply, means for automatically controlling the temperature in the retort by steam, mechanism for automatically controlling the pressure in the retort by compressed air, and clock actuated mechanism for establishing a definite progression of pressure and temperature values within the retort.

2. An apparatus for processing food stuffs and the like comprising a retort, a heating medium supply, a fluid pressure supply, means for automatically controlling the temperature in the retort by said heating medium, mechanism for automatically controlling the pressure in the retort by said fluid pressure, and clock actuated mechanism for establishing a definite progression of pressure and temperature values within the retort.

3. An apparatus for processing food stuffs and the like comprising a retort, means for admitting a heating fluid to said retort to control the temperatures therein, means for admitting a fluid under pressure to said retort to control the pressure therein, and mechanism for establishing a progression of temperature and pressure values within said retort.

4. An apparatus for processing food stuffs and the like comprising a retort, a steam conduit, a compressed air conduit, an exhaust conduit, each of said conduits being associated with said retort and being equipped with a valve, automatically operated means for manipulating said valves and clock actuated means adapted to vary the effectiveness of said automatic means.

5. An apparatus for processing food stuffs and the like comprising a retort, a heating fluid conduit, a pressure fluid conduit, an exhaust conduit, each of said conduits being associated with said retort and being equipped with a valve, automatically operated means to manipulate said valves and clock actuated mechanism to vary the effectiveness of said automatic means in manipulating said valves.

6. An apparatus for processing food stuffs and the like comprising a retort, means to conduct steam to said retort, means to conduct compressed air to said retort, automatic means controlling the admission of steam and air to said retort and adapted to effect a predetermined progression of pressure and temperature values in said retort.

7. An apparatus for processing food stuffs and the like comprising a retort, means to conduct a fluid under pressure to said retort and means controlling said fluid under pressure and adapted to produce a predetermined progression of pressure values within said retort.

8. An apparatus for processing food stuffs and the like comprising a retort; means to conduct a heating fluid, a pressure fluid, and a cooling fluid to said retort; motor valves controlling the admission of said fluids to said retort; and automatically operated means to manipulate said motor valves to gradually increase the temperature of said retort to a desired value, maintain said desired value over a definite period of time and then gradually reduce the temperature of said retort, while keeping the pressure therein greater than the pressure of steam at the retort temperature.

9. In a pressure process system, a retort, a heating fluid conduit and a cooling fluid conduit communicating with said conduit, valve means controlling the flow of fluids through said conduits, and means to actuate said valve means to vary the temperature within said retort in accordance with a predetermined time temperature curve.

10. In a pressure process system, a retort, a steam conduit and a water conduit communicating with said retort, valve means controlling the flow of fluids through said conduits to said retort, and means to actuate said valve means to vary the temperature within said retort in accordance with a predetermined time temperature curve.

11. In a pressure process system, a retort, a heating fluid conduit communicating with said retort, a valve controlling the flow of heating fluid through said conduit, a mixing chamber communicating with said retort, a heating fluid and a cooling fluid conduit communicating with said mixing chamber, valve means controlling the admission of fluids to said mixing chamber, a second valve means in series with said valve means for controlling the admission of fluids to said mixing chamber, and means to maintain said second valve means closed when heating fluid is being admitted to said retort.

12. A system for processing food stuffs and the like comprising a retort, means to admit a heating fluid to said retort as required to maintain a desired temperature during a cooking period, a conduit for admitting a cooling fluid to said retort, valve means adapted to prevent the admission of fluid to said cooling fluid conduit, and timed means to maintain said valve means closed during the cooking period.

13. A system for processing food stuffs and the like comprising a retort, means to admit a heating fluid to said retort as required to maintain a desired temperature during a cooking period, a conduit for admitting a cooling fluid to said retort, valve means adapted to prevent the admission of fluid to said cooling fluid conduit, and means to maintain said valve means closed during the cooking period and to open said valve means at the end of said cooking period.

14. A system for processing food stuffs and the like comprising a mixing chamber, a heating fluid conduit and a cooling fluid conduit communicating with said mixing chamber, a valve in each of said conduits, and means for automatically manipulating said valves to produce a progression of temperture values of the fluid in said mixing chamber.

15. A system for processing food stuffs and the like comprising a mixing chamber, a heating fluid conduit and a cooling fluid conduit communicating with said mixing chamber, heating and cooling fluid valves adapted to control the flow of fluids through said conduits, and a by-pass around said cooling fluid valve.

16. A system for processing food stuffs and the like comprising a mixing chamber, a heating fluid conduit and a cooling fluid conduit communicating with said mixing chamber, a pair of valves in series in each of said conduits, and means to simultaneously open one of the valves in each of said conduits.

17. A system for processing food stuffs and the like comprising a mixing chamber, a heating fluid conduit and a cooling fluid conduit communicating with said mixing chamber, a pair of valves in series in each of said conduits, and means to simultaneously open one of the valves in each of said conduits, said means being automatically operative at a definite time after said system has been set in operation.

18. A system for processing food stuffs and the like comprising a mixing chamber, a heating fluid conduit and a cooling fluid conduit communicating with said mixing chamber, a pair of valves in series in each of said conduits, and means automatically operative at a definite time after said system has been set in operation to open one of the valves in each of said conduits and to thereafter manipulate the other valves to produce a progression of temperature values of the fluid in said mixing chamber.

19. An apparatus for processing food stuffs and the like comprising a retort, automatically operated means to control the admission of a heating fluid to said retort to produce a definite progression of temperature values within said retort, and means to maintain said retort under a pressure greater than the pressure of steam at the retort temperature.

20. An apparatus for processing food stuffs and the like comprising a retort, automatically operated means to produce a desired progression of temperature values within said retort, and means to maintain the retort under a pressure greater than the pressure of steam at the retort temperature.

21. An apparatus for processing food stuffs and the like comprising a retort, clock actuated means to produce a desired progression of temperature values within said retort, and means to maintain the retort under a pressure greater than the pressure of steam at the retort temperature.

22. An apparatus for processing food stuffs and the like comprising a retort, clock actuated means controlling the admission of a heating fluid to said retort to gradually increase the temperature therein to a desired value and then maintain said desired value for a definite time, and means to maintain the retort under a pressure greater than the pressure of steam at the retort temperature.

23. An apparatus for processing food stuffs and the like comprising a retort, means to conduct a heating fluid to said retort, means to conduct a cooling fluid to said retort automatically operated means to control the admission of said fluids to the retort to gradually increase the temperature therein and later gradually decrease the temperature therein, and means to maintain the retort under a pressure greater than the pressure of steam at the retort temperature.

24. An apparatus for processing food stuffs and the like comprising a retort, and automatically operated means to produce a desired progression of temperature changes within said retort while maintaining the retort under a pressure greater than the pressure of steam at the retort temperature.

25. An apparatus for processing food stuffs and the like comprising a retort, means to automatically regulate the temperature and pressure within said retort, and clock actuated mechanism to progressively adjust said regulating means to produce a desired progression of temperature values within said retort.

26. An apparatus for processing food stuffs and the like comprising a retort, means to automatically regulate the temperature and pressure within said retort, and clock actuated mechanism to progressively adjust said regulating means to produce a desired progression of temperature and pressure values within said retort.

CHAUNCEY H. DURKEE.